United States Patent [19]
Gachot

[11] 3,843,091
[45] Oct. 22, 1974

[54] BALL VALVE FOR HIGH TEMPERATURES

[76] Inventor: Jean Gachot, 26, avenue de Paris, Soisy sous Montmorency, France

[22] Filed: Apr. 9, 1973

[21] Appl. No.: 349,544

[30] Foreign Application Priority Data
Apr. 25, 1972  France .............................. 72.14620

[52] U.S. Cl. .............................................. 251/315
[51] Int. Cl. ............................................... F16k 5/06
[58] Field of Search ........... 251/315, 322, 316, 175, 251/359–365

[56] References Cited
UNITED STATES PATENTS

| | | | |
|---|---|---|---|
| 2,685,296 | 8/1954 | Boosman | 251/332 UX |
| 3,174,495 | 3/1965 | Anderson et al. | 251/315 X |
| 3,177,887 | 4/1965 | Priese | 251/315 X |
| 3,346,233 | 10/1967 | Billson | 251/315 X |
| 3,480,253 | 11/1969 | Priese et al. | 251/315 X |
| 3,497,178 | 2/1970 | Priese | 251/315 X |
| 3,554,484 | 1/1971 | Gachot | 251/315 |
| 3,598,363 | 8/1971 | Shaw | 251/315 X |
| 3,705,707 | 12/1972 | Scaramucci | 251/315 X |
| 3,722,859 | 3/1973 | Murphy | 251/315 |

*Primary Examiner*—William R. Cline
*Assistant Examiner*—Ira S. Lazarus
*Attorney, Agent, or Firm*—Young & Thompson

[57] ABSTRACT

A hollow valve body limited by two coupling flanges contains a rotatable ball with a passageway extending through the ball and the flanges, a sealing ring formed of plastic material which flows in the hot state such as polytetrafluoroethylene being placed between the ball and one of the flanges. An annular recess is formed in the downstream flange and is proportional in capacity to the total volume of plastic material of the sealing ring. The ball is endowed with freedom of displacement from a normally-closed position to a position in which it is capable of bearing on a metallic seat formed on the downstream flange in the event of high-temperature flow of the sealing ring.

8 Claims, 9 Drawing Figures

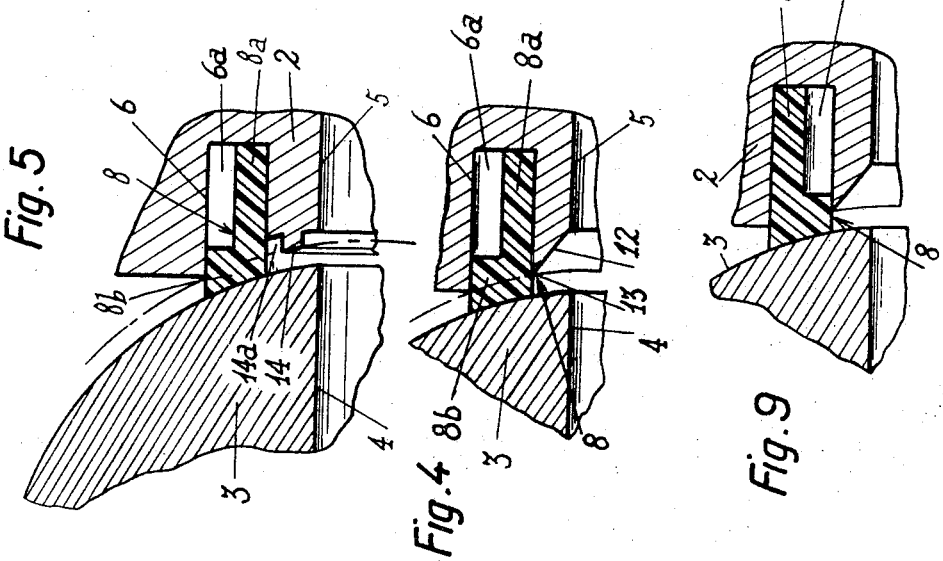
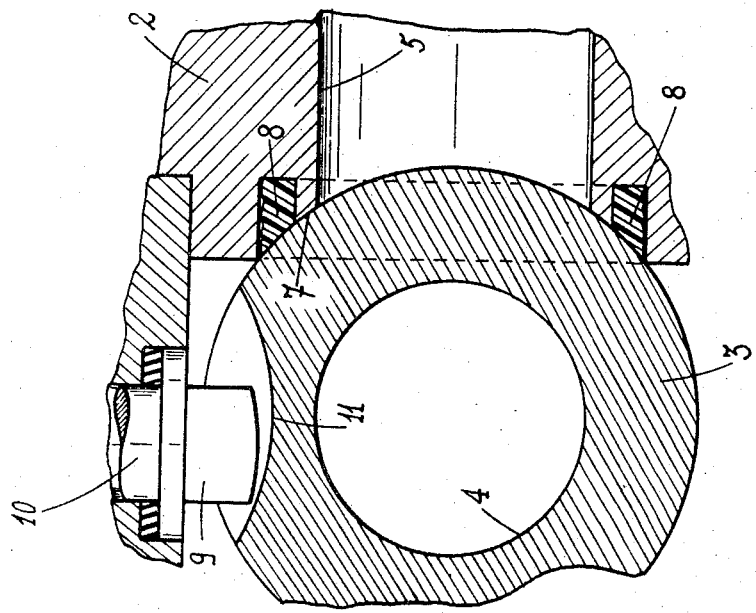

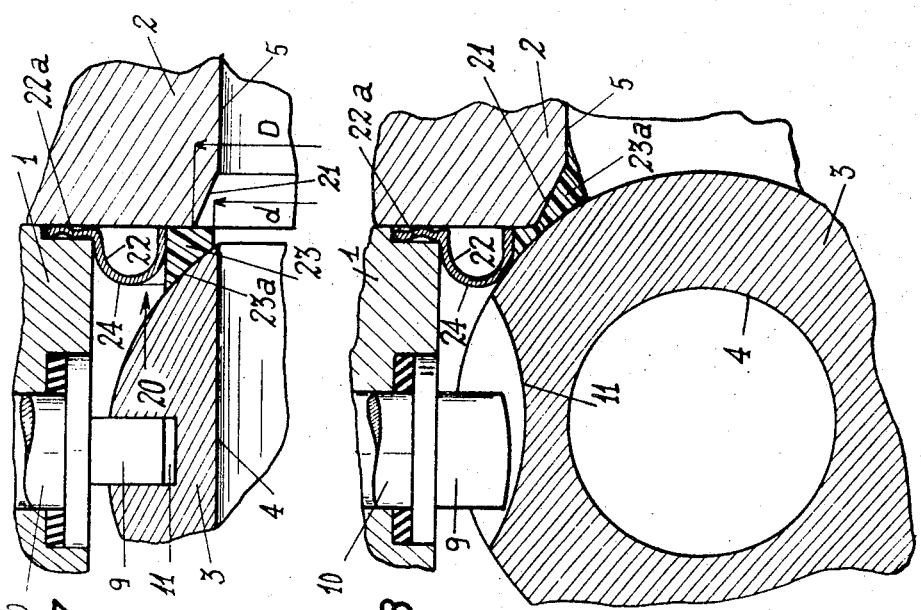
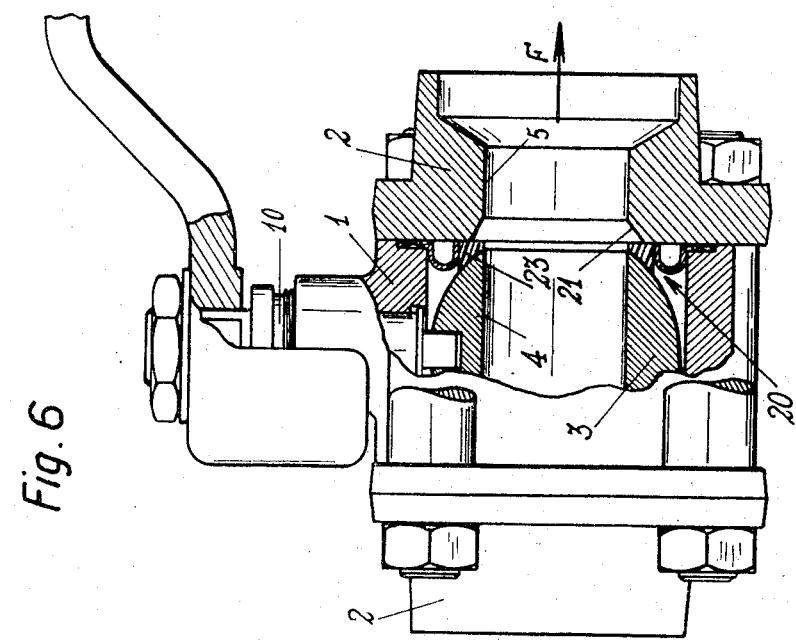

BALL VALVE FOR HIGH TEMPERATURES

This invention relates to an improved ball valve which is intended to afford resistance to high temperatures. The valve is primarily applicable to pipelines for conveying inflammable fluids such as petroleum products in which it is essential to ensure perfect fluid-tightness of the valves in the closed position and in the event of fire, even if the ambient temperature attains values which result in impairment or even destruction of the valve seals. In the following description and appended claims, the term "valve" must be considered in its widest sense and applies irrespective of the diameter of the pipeline. The invention therefore includes devices which are often designated as gate-valves.

It is known that the closure member of a ball valve consists of a spherical plug rotatably mounted within a hollow valve body which is placed between two flanges for connecting the body to the pipeline, an axial passageway being pierced in the spherical plug and in the flanges. A control device is provided for displacing the ball in rotational motion between two sealing rings about an axis located at right angles to the axis of the passageway.

The advantage of these valves lies in their great simplicity of manufacture and assembly.

In order to form the sealing rings, use is made in particular of polytetrafluoroethylene and other polyfluorinated resins. These plastics exhibit good properties of fluid-tightness, self-lubrication and resistance to chemical products even at a relatively high temperature but they have the disadvantage of exhibiting creep or hot flow, especially when the temperature becomes too high. The valve is then no longer fluid-tight in the closed position, especially by reason of the burrs formed on the plastic material as a result of the flow process.

When the pipeline contains inflammable products and especially petroleum products, this is a major disadvantage in the event of fire since the products then continue to feed the seat of the fire even after closure of the valve.

The aim of the present invention is to overcome the above-mentioned disadvantages and to ensure good fluidtightness of the valve in the event of elimination of the material constituting the sealing ring, especially under the action of heat and at temperatures higher than 400°C.

In accordance with the invention, the ball valve which is intended to afford resistance to high temperatures and comprises a hollow valve body limited by two flanges and containing a rotatable ball with a passageway for the fluid formed in said ball and in said flanges, a device for controlling the rotation of the ball, a sealing ring formed of plastic material such as polytetrafluoroethylene or like hot-flowing resin and placed between said ball and at least one of said flanges, is characterized in that the flange which is placed downstream in the direction of flow of the fluid is provided with a recess forming an annular relief volume which is proportional to the total volume of plastic material contained in the sealing ring and that, in the closed position of the valve, the ball is provided relatively to its control device with a certain freedom of displacement within the valve body in the downstream direction, a metallic seat being additionally formed so as to receive the ball on the downstream side in the event of elimination of the plastic material of the sealing ring at high temperatures.

The ball can thus be applied against the entire metallic seat and the material of the sealing ring cannot prevent closure of the valve at any point since said material has flowed into the relief volume. Fluid-tightness is therefore achieved even at temperatures which normally result in impairment or destruction of the seal.

As will be readily apparent, the two flanges contemplated in the foregoing are not necessarily detachable in both cases. The invention also applies to the form of construction in which one of the flanges is integral with the valve body.

In a first embodiment in which the downstream flange is provided with an annular groove around the pipe, the sealing ring is partially inserted in said groove and this latter has a residual hollow volume at least equal to the volume of that portion of the sealing ring which is located outside the groove. Said hollow volume constitutes the relief volume which is provided for the plastic material located outside the groove.

The material of the sealing ring is thus permitted to flow entirely into the groove without causing any hindrance to closure by the ball.

The downstream flange is preferably provided opposite to the ball and in the vicinity of the groove in which the sealing ring is inserted with a metallic seat for receiving the ball in the event of elimination of the plastic material at high temperatures. The ball thus closes the valve by metal-to-metal contact.

In one advantageous form of construction, the sealing ring is provided at the end remote from the ball with a tubular extension which is tightly fitted over the lateral groove wall which is nearest the passageway and at the end adjacent to the ball with an annular enlargement which is applied against both lateral walls of the groove and projects from this latter so as to serve as a seat for the ball under normal conditions of use. This arrangement permits better elimination of the sealing ring in the event of hot flow.

In a second embodiment, the invention is applied to a ball valve in which the hollow valve body contains at least at the downstream end a composite seal for the ball, said seal being composed of an annular diaphragm with a metallic core joined to a ring of plastic material such as polytetrafluoroethylene which flows in the hot state and serves as a seat for the ball in normal service. Said valve is accordingly distinguished by the fact that the diaphragm is advantageously provided with a projecting annular element which surrounds the ring and is directed towards the ball, said element being so shaped as to form a seat for the ball in the event of elimination of the plastic material of the ring at high temperatures, the recess provided for the ring being also adapted to communicate with the flange passageway by means of a chamfer which constitutes in conjunction with said passageway a relieving volume for the plastic material in the event of hot flow.

As in the first embodiment, the means aforesaid permit perfect elimination of the ring material at high temperatures. The ball accordingly comes into contact with the projecting annular element of the diaphragm which affords much better resistance to high temperatures than the ring even if said diaphragm is coated with polyfluorinated resin.

The internal diameter of the ring is preferably smaller than the external diameter of the chamfer. The plastic material which is eliminated at high temperatures can thus flow more readily into the chamfer without hindering the closure of the metallic seat by the ball.

In both embodiments, the control device for rotating the ball is preferably connected to this latter by means of a system consisting of a tongue and groove with provision for working play so as to permit the relative displacement thereof along the axis of the groove which is oriented at right angles to the ball passageway. The ball is thus endowed with freedom of displacement towards the downstream side in the closed position and is capable of bearing on the seat provided for this purpose under the action of the pressure of fluid in the event of elimination of the plastic ring.

Further particular features of the invention will become apparent from the following description, reference being had to the accompanying drawings which are given solely by way of example without any limitation being implied and which illustrate two practical embodiments of the invention, and wherein:

FIG. 3 is a view which is similar to FIG. 2 in the closed position of the valve and in which the sealing ring has been eliminated by hot flow;

FIGS. 4 and 5 are partial axial sectional views which are similar to FIG. 1 and show alternative forms of the first embodiment;

FIG. 6 is a fragmentary view in longitudinal elevation and in axial cross-section, in a second embodiment in which the valve is shown in the open position and in the state of normal service;

FIG. 7 is a partial axial sectional view to a larger scale and corresponding to FIG. 6;

FIG. 8 is a view which is similar to FIG. 7 in the closed position of the valve and in which the sealing ring has been eliminated by hot flow;

FIG. 9 is a diagram which is similar to FIGS. 4 and 5 and shows an alternative form of construction.

Figures 1, 2:
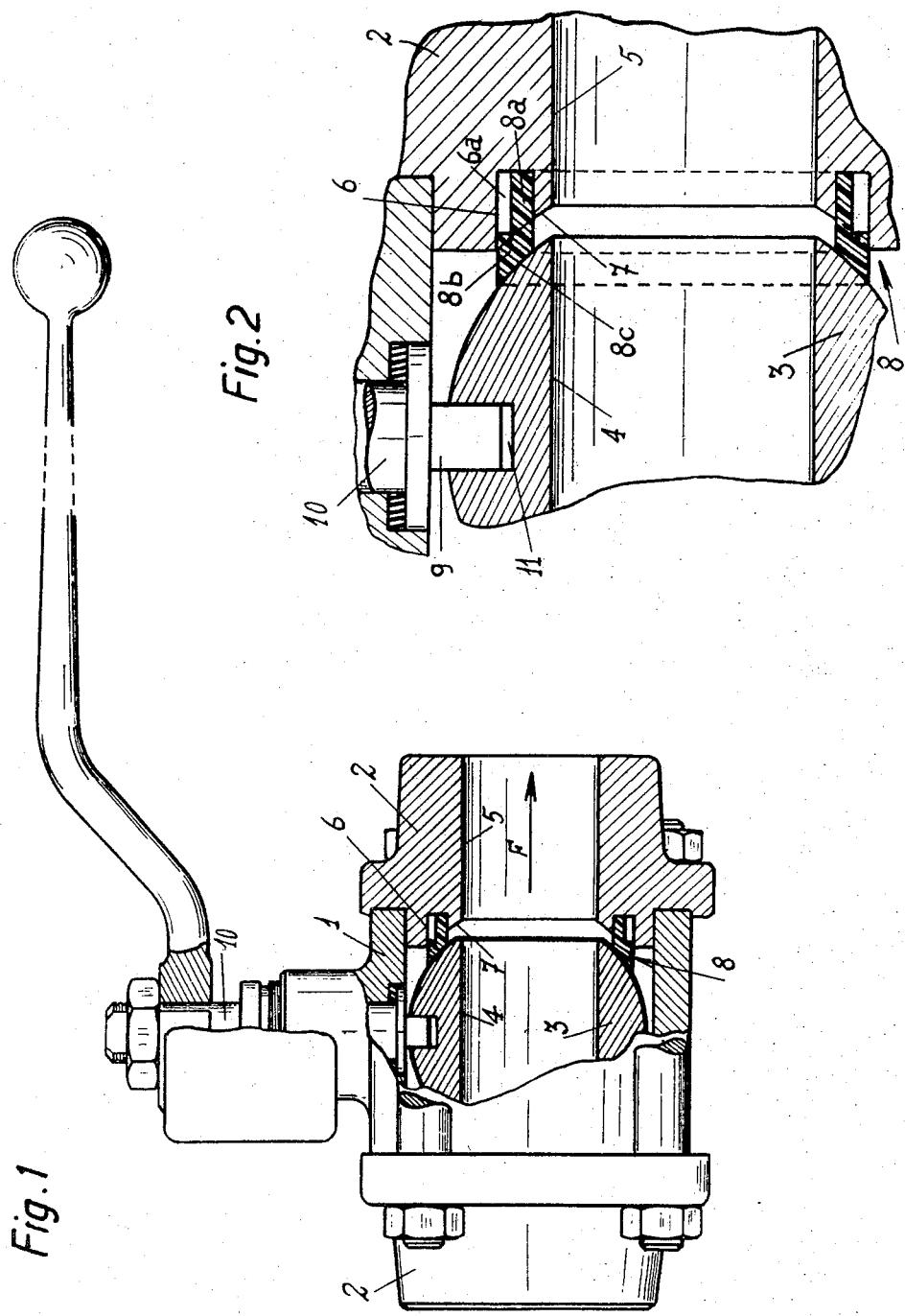
FIG. 1 is a fragmentary view in longitudinal elevation and in axial cross-section, in a first embodiment in which the valve is shown in the open position and in the state of normal service.
FIG. 2 is an axial sectional view to a larger scale and showing a portion of the valve which corresponds to FIG. 1.

In the first embodiment of the invention as described with reference to FIGS. 1 to 3, there is shown a valve of the type considered which comprises a hollow valve body 1 provided with two flanges 2 for connecting to the pipeline and containing a rotatable ball 3. The ball 3 is pierced by a passageway 4 and the flanges 2 are pierced by a passageway 5 through which the fluid circulates in the direction of the arrow F, namely in the downstream direction.

Rotational displacement of the ball 3 is controlled by an actuating device which endows said ball with a certain freedom of movement towards the downstream side in the closed position. This device comprises an operating shaft 10 which is connected to the ball 3 by a system consisting of a tongue 9 and groove 11, the groove 11 being placed at right angles to the passageway 4. The connection between the tongue 9 and the groove 11 is provided with an appreciable degree of working play both in a direction parallel to the axis of the passageway 5 and at right angles to said axis as shown in FIGS. 2 and 3.

An annular groove 6 surrounding the passageway 5 is formed at least in the flange 2 which is placed on the downstream side. A metallic seat 7 is formed opposite to the ball 3 between the groove 6 and the passageway 5. In FIGS. 1 to 3, the seat 7 is constituted by a spherical surface which has the same diameter as the ball 3 and is centered on the axis of the passageway 5.

A sealing ring 8 which is partially fitted within the groove 6 is placed between the ball 3 and the flange 2. Under conditions of normal service, said ring constitutes a seal in the open and closed positions of the valve. Said seal is formed of plastic material which is capable of flowing in the hot state, such as a polyfluorinated resin, e.g., polytetrafluoroethylene.

In one advantageous embodiment, the material which forms the sealing ring 8 is constituted by a mixture of polytetrafluoroethylene and of small particles (2 to 50 microns, for example) of stainless steel. This mixture ensures a high standard of fluid-tightness and affords even higher resistance to wear than pure polytetrafluoroethylene. The 50 percent mixture ensures very satisfactory results.

The sealing ring 8 is provided at the end remote from the ball 3 with a thinned-down tubular extension 8a and at the end nearest the ball 3 with an annular enlargement 8b.

The extension 8a which is fitted within the groove 6 is applied against that lateral wall of this latter which is adjacent to the passageway 5. The thickness of said extension is smaller than the width of the groove 6 and an annular cavity 6a thus remains within the groove 6 on the side remote from the passageway 5.

The annular enlargement 8b is partially engaged within the groove 6 and is in contact with the two side walls of this latter. The enlargement 8b projects from the groove 6 and its front face provides a spherical bearing surface 8c which serves as a seat for the ball 3 under normal conditions of operation.

As a preferred feature, the volume of the residual cavity 6a is at least equal to the volume of the annular enlargement 8b located outside said groove and, in the event of high-temperature flow, constitutes a relieving volume for the corresponding plastic material. In particular, it is an advantage to ensure that the volume of the groove 6 exceeds the volume of the ring 8 by 5 to 10 percent as measured in the cold state. Moreover, the lips which extend on each side of the groove 6 are provided with sharp edges.

The effects and advantages of this embodiment are as follows:

During normal operation, the valve behaves in the same manner as ball valves of the same type and the sealing ring 8 accordingly ensures fluid-tightness in the open and closed positions. Since the tubular extension 8a is tightly fitted over the inner wall of the groove 6, the ring 8 is securely attached to the flange 2, particularly by virtue of the fact that the enlarged portion 8b is engaged within said groove and is also in contact with the outer wall of this latter. By virtue of the fact that polytetrafluoroethylene is endowed with a low coefficient of friction, good qualities of fluid-tightness and high resistance to chemical agents, the operation of the valve is very satisfactory even at a relatively high temperature.

In the event of overheating caused by a fire, for example, the valve is placed in the closed position. But if the ambient temperature becomes too high, the material of the sealing ring 8 softens and is liable to flow. Since the groove 11 is accordingly oriented parallel to the passageway 5 of the flange 2, the ball 3 tends to move under the pressure of the fluid towards said flange in the direction of the arrow F. The ball forces the plastic material outside the groove 6 into the cavity 6a and, taking into account the volume of said cavity, the entire quantity of plastic material of the ring 8 can then fill the groove 6 without forming any rough excrescences (this condition being shown in FIG. 3).

The ball 3 can thus be applied against the entire periphery of the metallic seat 7 and fluid-tightness is accordingly ensured by metal-to-metal contact, with the result that fluid-tight closure is maintained. If the valve is not otherwise damaged as a result of overheating, it is only necessary to replace the sealing ring 8 in order to use the valve again for normal service.

If a few burrs or excrescences were nevertheless formed by the sealing ring on the side nearest the seat 7, they would easily be cut off by the sharp edges of the groove 6.

In a first alternative form of construction (shown in FIG. 4), the flange 2 is provided at the inlet of the passageway 5 with a chamfer 12 which extends up to the side wall of the groove 6 which is nearest said passageway. The metallic seat is constituted by the circular edge 13 which separates the chamfer 12 from the adjacent wall of said groove.

In the event of elimination of the sealing ring 8, the plastic material flows into the groove 6 as in the previous case and the ball 3 is applied against the edge 13.

If the degree of softening of the seal 8 is such that this latter exhibits a tendency to form beads or burrs on each side of the inlet of the groove 6, the chamfer 12 permits the discharge of these fragments of the plastic material in the downstream direction. Fluid-tightness is therefore ensured by the metal-to-metal contact.

In another form of construction shown in FIG. 5, the seat for receiving the ball is constituted by an annular rib 14 of the flange 2 which is placed opposite to the ball 3. The annular hollow space 14a which is thus provided between the groove 6 and the rib 14 serves to collect any excrescences derived from the seal 8 while providing the ball 3 with a larger bearing surface than in the previous version.

In the second embodiment of the invention which is contemplated with reference to FIGS. 6 to 8, in which the same elements are designated by the same references, the ball valve is fitted with a seal 20 of a composite type. The seal 20 in fact consists of an annular diaphragm having a metallic core 22 and joined to a ring 23 of plastic material such as polytetrafluoroethylene. The metallic core of the diaphragm 22 is preferably covered over its entire surface with a thin coating of the same plastic material.

The external wall of the diaphragm 22 has corrugations 22a which are clamped between the valve body 1 and the flange 2 and ensure the requisite fluid-tightness between these elements. The sealing ring 23 is applied against the internal wall of the diaphragm 22 and provides the ball 3 with a spherical bearing surface 23a forming a valve-seat (as shown in FIG. 7). The ring 23 can be mounted by forcible elastic insertion. The diaphragm 22 is provided between the external and internal walls aforesaid with a projecting annular element 24 which is directed towards the ball 3 and surrounds the ring 23.

Finally, provision is made within the passageway 5 of the flange 2 on the side facing the valve body 1 with a frusto-conical chamfer 21 having an external diameter D which is larger than the internal diameter $d$ of the ring 23, with the result that the internal portion of said ring projects with respect to the inlet of the passageway 5.

The effects and advantages of this embodiment are as follows:

Under normal conditions of service, the sealing ring 23 ensures fluid-tightness in the open and closed positions. The ring 23 which is clamped between the flange 2, the projecting annular element 24 and the ball 3 is incapable of displacement. The plastic material employed ensures good operation of the valve even at a relatively high temperature.

In the event of overheating, the valve is placed in the closed position. The plastic material of the sealing ring 23 flows in the direction of the arrow F. Since the internal diameter of the ring 23 is smaller than the external diameter of the chamfer 21, the thrust exerted by the ball 3 causes said material to pass readily towards the chamfer 21 and the passageway 5. Finally, said material is placed at least partially within said chamfer after hot flow and any additional quantity occupies the entrance of the passageway 5 as shown in FIG. 8. The chamfer 21 constitutes in this case the relief volume which is provided by the invention.

The ball 3 has a certain freedom of movement in the downstream direction by reason of the arrangement of its control device and is consequently applied against the seat of the projecting annular element 24 under the pressure of the fluid. The thin coating of plastic material which is formed on the core of said projecting annular element flows under the pressure and a metal-to-metal contact ensures good fluid-tightness. The valve can be used again after changing the composite seal 20 if it has not been damaged by the heat.

It is readily apparent that the invention is not limited to the second embodiment hereinabove described but can be extended to alternative forms of construction.

From this it follows that the sealing ring 8 of the first embodiment could have a portion 8a having a frusto-conical rather than a cylindrical cross-section. Similarly, as shown in FIG. 9, the seal 8 can be shaped in such a manner that the residual cavity 6a formed in the annular groove 6 is located between the passageway 5 and the tubular extension 8a.

It will also be understood that one of the flanges 2 need not consist of a detachable member but could be constituted by a portion of the valve body which is designed and arranged accordingly.

Finally, it will appear self-evident that, although a manual-control valve is illustrated in the drawings, the invention also applies to automatic-control valves.

What I claim is:

1. A ball valve to resist high temperatures, comprising a hollow valve body limited by two flanges and containing a rotatable ball with a passageway for the fluid, means to rotate the ball, a sealing ring of hot-flowing resin between said ball and at least one of said flanges, the ball in the closed position of the valve having freedom of displacement within the valve body relative to said valve rotating means in the downstream direction, the flange which is downstream in the fluid flow direction having an annular groove including lateral groove walls, the sealing ring being partially disposed in said groove, said groove having a residual hollow volume which is at least equal to the volume of that portion of the sealing ring which is located outside the groove, in order to permit said groove to receive the whole of the material of the sealing ring which is located outside the groove, said downstream flange having opposite to the ball and in the vicinity of the groove a metallic seat to receive the ball in the event of elimination of the sealing ring material at high temperatures, the sealing ring having at its end remote from the ball a tubular extension tightly fitted over one of the lateral groove walls.

2. A valve according to claim 1, wherein the seat for receiving the ball is constituted by the line of intersection between a chamfer of the flange at the entrance of the passageway and the adjacent wall of the groove which contains the sealing ring.

3. A valve according to claim 1, wherein the seat for receiving the ball is constituted by an annular rib of the flange, said rib being separated from the groove containing the sealing ring by a hollow annular space.

4. A valve according claim 1, wherein the material of said sealing ring is constituted by a mixture of polytetrafluoroethylene and small particles of stainless steel.

5. A valve according to claim 1, said tubular extension being fitted over the lateral groove wall which is nearest the passageway, the sealing ring having at its end adjacent the ball an annular enlargement which is applied against opposite lateral walls of said groove and which projects outside of said groove to serve as a seat for the ball in normal use.

6. A valve according to claim 1, wherein the volume of said enlargement is such with respect to the volume of said groove as to wholly fill said groove at high temperatures.

7. A ball valve to resist high temperatures, comprising a hollow valve body limited by two flanges and containing a rotatable ball with a passageway for the fluid, means to rotate the ball in the body, a sealing ring of hot-flowing resin between said ball and at least one of said flanges, the flange which is downstream in the direction of flow of the fluid having therein a recess defining an annular relief volume, the ball in the closed position of the valve having freedom of displacement within the valve body relative to said valve rotating means in the downstream direction, said body having a metallic seat to receive the ball on the downstream side in the event of elimination of the material of the sealing ring at high temperatures, said valve body containing at least at the downstream end a composite seal for the ball, said seal comprising an annular diaphragm with a metallic core joined to a ring of plastic material which serves as a seat for the ball in normal service, the diaphragm having a projecting annular element which surrounds the ring and is directed toward the ball, said element being so shaped as to form a seat for the ball in the event of elimination of the plastic material of the ring at high temperatures, the recess communicating with said passageway by means of a chamfer which constitutes in conjunction with said passageway a relieving volume for the plastic material in the event of hot flow, the external diameter of the chamfer being larger than the internal diameter of the sealing ring.

8. A valve according to claim 7, wherein the sealing ring is disposed at least partially within the chamfer in the event of elimination of said ring at high temperatures, any additional quantity being disposed within the flange passageway.

* * * * *